United States Patent
Morton et al.

(10) Patent No.: US 6,985,853 B2
(45) Date of Patent: Jan. 10, 2006

(54) COMPRESSED AUDIO STREAM DATA DECODER MEMORY SHARING TECHNIQUES

(75) Inventors: Paul Morton, Vancouver (CA); Darwin Rambo, Cloverdale (CA)

(73) Assignee: Broadcom Corporation, Irvine, CA (US)

( * ) Notice: Subject to any disclaimer, the term of this patent is extended or adjusted under 35 U.S.C. 154(b) by 689 days.

(21) Appl. No.: 10/087,290

(22) Filed: Feb. 28, 2002

(65) Prior Publication Data

US 2003/0163327 A1 Aug. 28, 2003

(51) Int. Cl.
*G10L 19/00* (2006.01)

(52) U.S. Cl. ............................. 704/201; 382/305

(58) Field of Classification Search ............... 704/201; 382/305; 709/250; 341/51
See application file for complete search history.

(56) References Cited

U.S. PATENT DOCUMENTS

| | | | | |
|---|---|---|---|---|
| 5,374,916 A | * | 12/1994 | Chu ........................... | 340/146.2 |
| 5,627,533 A | * | 5/1997 | Clark ......................... | 341/51 |
| 5,768,445 A | * | 6/1998 | Troeller et al. ............. | 382/305 |
| 5,940,479 A | | 8/1999 | Guy et al. | |
| 6,208,273 B1 | * | 3/2001 | Dye et al. .................. | 341/51 |
| 6,259,695 B1 | | 7/2001 | Ofek | |
| 6,310,981 B1 | * | 10/2001 | Makiyama et al. ......... | 382/239 |
| 6,343,263 B1 | * | 1/2002 | Nichols et al. ............. | 702/189 |
| 6,378,010 B1 | * | 4/2002 | Burks ......................... | 710/68 |
| 6,633,608 B1 | * | 10/2003 | Miller ......................... | 375/240.02 |
| 6,683,889 B1 | * | 1/2004 | Shaffer et al. .............. | 370/516 |
| 2001/0005382 A1 | | 6/2001 | Cave et al. | |

FOREIGN PATENT DOCUMENTS

| | | |
|---|---|---|
| WO | WO 01/72025 | 9/2001 |
| WO | WO 01/86914 | 11/2001 |

* cited by examiner

*Primary Examiner*—Richemond Dorvil
*Assistant Examiner*—Donald L. Storm
(74) *Attorney, Agent, or Firm*—McAndrews, Held & Malloy, Ltd

(57) ABSTRACT

A decoder (10) decodes compressed data. A memory (44) stores the compressed data and stores operating data and operating code for a plurality of decompression algorithms requiring different amounts of memory for the operating data and operating code and requiring different amounts of memory to store compressed data corresponding to a predetermined amount of uncompressed data. A processor (42) is arranged to select one of the decompression algorithms, to allocate an amount of the memory for storing compressed data and operating data and operating code depending on the decompression algorithm selected and to decode the compressed data stored in the allocated amount of memory.

32 Claims, 2 Drawing Sheets

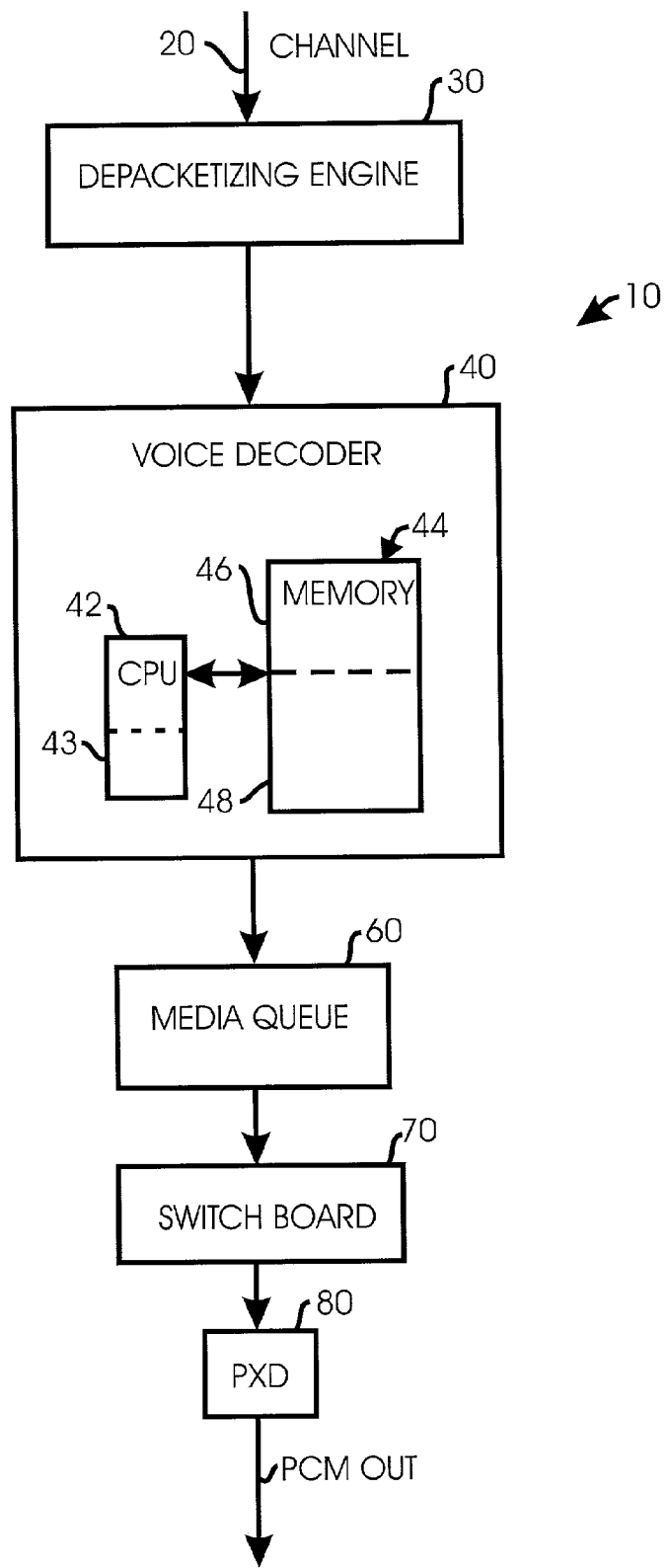

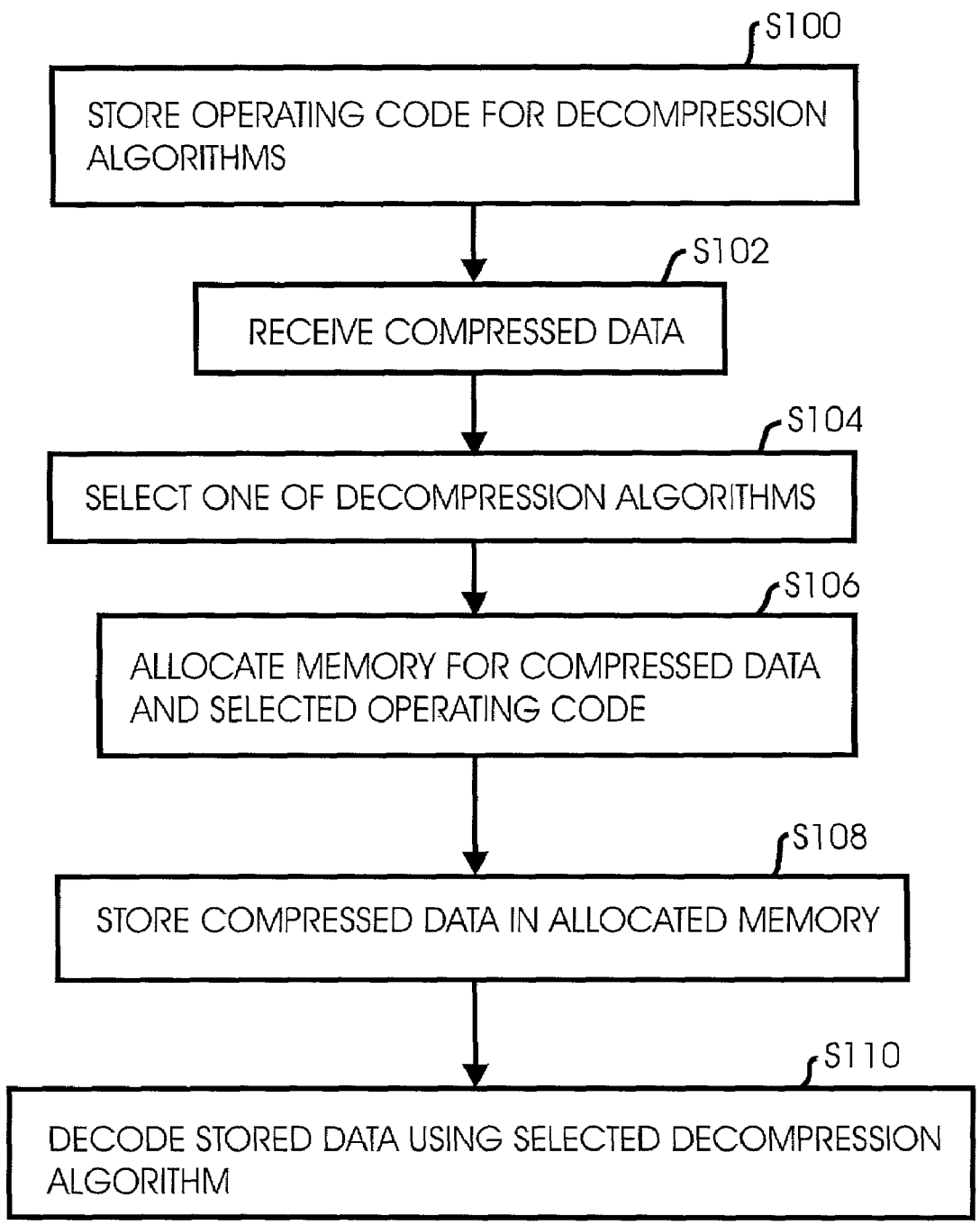

COMPRESSED AUDIO STREAM DATA DECODER MEMORY SHARING TECHNIQUES

BACKGROUND OF THE INVENTION

This invention relates to decoding of compressed audio stream data and particularly relates to allocating memory for the decoding of such data.

Decoding compressed audio stream data frequently involves removing jitter from the compressed data. Removing the jitter requires implementation of a jitter buffer, which stores an amount of compressed data, such as compressed packet voice data. Packets typically are put into the jitter buffer from a packet network at a non-constant rate (i.e., with jitter). Data is extracted from the buffer at a constant rate and played out into the telephone network. Previous decoders have sized the jitter buffer to hold a given amount of G.711 data (pulse code modulated (PCM) data transmitted at 64 kilo bits per second(kbps)). This jitter buffer size is usually expressed in bytes or the time duration of G.711 samples. The jitter buffer consumes a significant amount of memory. For example, a 200 millisecond (ms) jitter buffer requires at least 1600 bytes of memory (i.e. 200 ms of G.711 data requires 1600 bytes). Previous decoders do not have the means of re-sizing a jitter buffer whenever the voice decoder algorithm changes dynamically, based on the type of voice decoder algorithm in use. As a result, prior decoders have wasted memory and required excessively large memories. This invention addresses the problem and provides a solution.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

One apparatus embodiment of the invention is useful in a decoder for decoding compressed audio stream data. In such an environment, decoding apparatus comprises a memory arranged to store the compressed data and to store at least one of operating data and operating code for a plurality of decompression algorithms requiring different amounts of memory for the operating data and operating code and requiring different amounts of memory to store compressed data corresponding to a predetermined duration of uncompressed data. A processor is arranged to select one of the decompression algorithms, to allocate an amount of the memory for storing compressed data and at least one of operating data and operating code depending on the decompression algorithm selected and to decode the compressed data stored in the allocated amount of memory.

One method embodiment of the invention is useful for allocating memory for decoding compressed audio stream data. In such an environment, the memory is allocated by steps comprising storing at least one of operating data and operating code for a plurality of decompression algorithms requiring different amounts of memory for the operating data and operating code and requiring different amounts of memory to store compressed data corresponding to a predetermined amount of uncompressed data. One of the decompression algorithms is selected and an amount of the memory is allocated for storing compressed data and at least one of operating data and operating code depending on the decompression algorithm selected. At last a portion of the compressed data is stored in the allocated amount of memory, and the stored compressed data is decoded using the selected decompression algorithm.

Another embodiment of the invention is useful in a computer readable media encoded with executable instructions representing a computer program that can cause a computer to dynamically size memory by performing the tasks of storing at least one of operating data and operating code for a plurality of decompression algorithms requiring different amounts of memory for the operating data and operating code and requiring different amounts of memory to store compressed data corresponding to a predetermined amount of uncompressed data. One of the decompression algorithms is selected, and an amount of the memory is allocated for storing compressed data and at least one of operating data and operating code depending on the decompression algorithm selected. At last a portion of the compressed data is stored in the allocated amount of memory, and the stored compressed data is decoded using the selected decompression algorithm.

These and other advantages and novel features of the present invention, as well as details of an illustrated embodiment thereof, will be more fully understood from the following description and drawings.

BRIEF DESCRIPTION OF THE DRAWINGS

FIG. 1 is a schematic block diagram of a one embodiment of the invention.

FIG. 2 is a flow diagram illustrating one method embodiment of the invention and describing a portion of the operation of the apparatus shown in FIG. 1.

DETAILED DESCRIPTION OF THE INVENTION

The inventor has recognized that for a range of voice decompression algorithms, the more highly compressed the data the more operating data plus operating code the algorithm consumes. Furthermore, a lower bit rate algorithm requires a smaller jitter buffer to store a given duration of data. Prior decoders allocated a worst-case amount of memory for voice decompression algorithm operating data (plus optionally operating code) plus a worst-case amount of memory for a jitter buffer. The inventor recognized that both worst cases do not occur simultaneously. The embodiments described in this specification provide for dynamic resizing of a jitter buffer based on the voice decompression algorithm needed for decoding. Thus, the amount of memory allocated for decompression algorithm operating data (plus optionally operating code) plus compressed data can be changed depending on the algorithm used for decoding. One example of dynamic memory allocation is allocation during a phone call depending on the type of compressed data that needs to be decoded.

The embodiments of a decoder 10 made in accordance with the invention will be explained in the context of a voice over packet network (e.g., VoIP or VoATM) application. Referring to FIG. 1, packets of G.711, G.726, G.728 or another voice encoder (vocoder) algorithm encoded (i.e., compressed) voice data are received on a channel 20. The packets typically are generated by a vocoder, which forms part of a voice transmitter.

A depacketizing engine 30 identifies the type of packets received from the host (i.e., voice packet, DTMF packet, call progress tone packet, SID packet, etc.), and transforms the packets into frames that are protocol independent. The depacketizing engine 30 then transfers the voice frames (or voice parameters in the case of silence identifier (SID) packets) into a voice decoder 40. (The depacketizing engine 30 also may transfer DTMF frames into a DTMF queue not shown and transfer call progress tones into the call progress tone queue not shown.)

Voice decoder 40 includes a central processing unit (CPU) 42 and a memory 44. Memory 44 is a computer readable media that stores either operating data and operating code or operating data without operating code for decompression algorithms corresponding to the G.711, G.726, G.728 or another vocoder algorithm encoded data. The packets of data include information identifying the type of encoded data (e.g., G.711, G.726 or G.728 encoded data). In response to this information, CPU 42 selects the appropriate algorithm required for decoding the data and allocates an amount of memory 44 for storing compressed data and either operating data and operating code or operating data without operating code for the selected algorithm. CPU 42 then stores either the operating data and operating code or operating data without operating code for the algorithm in memory 44 (if the operating data and operating code is not already located in memory 44) and stores compressed data from engine 30 in the allocated memory. For example, a portion 46 of memory 44 is used to store operating data and operating code for the selected algorithm and a portion 48 of memory 44 is used to store compressed data from engine 30.

The allocation of memory may occur at the beginning of a phone call represented by compressed voice data received on channel 20. Thus, CPU 42 dynamically allocates memory 40 as needed depending on the type of compressed data used for the call and the type of decompression algorithm required to decode the data.

CPU 42 then removes jitter from the compressed data stored in memory portion 48, decodes the compressed data from memory portion 48 and transmits the resulting decompressed data to a media queue 60. Queue 60 may be used for various purposes, but is not needed for all applications. For example, a tone generator may overwrite queue 60 to generate DTMF tones. The data from the queue 60 is transmitted to a switch board 70 and then to a physical device (PXD) 80, which provides two way communication with a telephone or a circuit-switched network, such as a PSTN line (e.g. DSO) carrying a 64 kb/s pulse code modulated (PCM) signal, i.e., digital voice samples.

CPU 42 includes a program memory 43, which stores computer code representing an algorithm by which the memory allocating functions described in this specification are performed. This computer code may include the operating code for the decompression algorithms. Note that some implementations may execute the decompression algorithm operating code directly from program memory 43 or may instead copy operating code for a specific decompression algorithm to memory 44 and execute it directly from memory 44. Those skilled in communications and programming are able to write such code from the functions described in this specification.

Referring to FIG. 2, the decoder shown in FIG. 1 operates to allocate memory in the following manner. In step S100, CPU 42 stores either operating data and operating code or operating data without operating code for decompression algorithms of the types previously described. In step S102, compressed data of the type previously described is received from channel 20 at the beginning of a call. In step S104, information in the data is analyzed by CPU 42 to determine the type of compression used for the call, and an appropriate one of the decompression algorithms is selected. In step 106, an appropriate amount of memory 44 is allocated for compressed data and for either operating data and operating code or operating data without operating code for the selected decompression algorithm. In step S108, either operating data and operating code or operating data without operating code is stored in memory portion 46 and compressed data is stored in memory portion 48. In step S110, the compressed data stored in memory portion 48 is decoded, including the removal of jitter by well-known algorithms.

The steps shown in FIG. 2 are used to implement a gateway packet voice exchange service (PVE). The memory consumption of the PVE Service is affected by its compilation parameters. There are two main factors affecting memory 44 consumption:

(1) The amount of either operating data and operating code or operating data without operating code requiring storage in portion 46 of memory 44 varies with the combination of vocoders chosen via compilation parameters. More complex vocoders generally require more operating data and operating code.

(2) The amount of compressed data requiring storage in portion 48 of memory 44 varies with a parameter, such as XCFG_GLOBAL_MAX_JITTER_MSEC, which represents the maximum duration of audio stream signal (e.g., voice) that can be generated from the compressed data. Compressed data of greater complexity generally can generate a longer duration of voice signal and sound with fewer stored bytes.

Since jitter buffer duration is expressed in milliseconds (ms), the actual consumption in bytes of compressed data is dependent upon the type of compressed data stored within portion 48 of memory 44. For example, 200 ms of G.711 encoded data requires 1600 bytes, whereas 200 ms of G.728 encoded data requires 400 bytes. Each vocoder consumes a different amount of memory while it is running. Generally more complex vocoders consume more operational data and operational code. However the more complex vocoders have a lower bit rate and therefore need less coded data in memory portion 48 to generate the same duration of audio stream signal. The PVE Service exploits this trade-off between vocoder decoder operational memory (i.e. instance memory) and compressed data memory to reduce its overall memory consumption. For an example, where operational code is not stored in memory 44, if the PVE Service supports G.711, G.726 and G.728 encoded data, CPU 42 allocates memory 44 according to the expression:

$$\begin{aligned}\text{PVE\_memory} = \text{MAXIMUM} (\\ &\text{G711d\_inst} + \text{XCFG\_GLOBAL\_MAX\_JITTER\_MSEC}*8,\\ &\text{G726d\_inst} + \text{XCFG\_GLOBAL\_MAX\_JITTER\_MSEC}*5,\\ &\text{G728D\_inst} + \text{XCFG\_GLOBAL\_MAX\_JITTER\_MSEC}*2 )\end{aligned}$$

Where Gxxxd_inst represents the amount of decoder operational data stored in memory portion 46 for the G.xxx vocoder, XCFG_GLOBAL_MAX_JITTER_MSEC*x represents the amount of compressed data stored in memory portion 48 for the G.xxx vocoder, and PVE_memory represents the total amount of memory allocated in memory 44 for the selected vocoder.

The foregoing method of resizing memory 44 based on the decompression algorithm type saves memory compared to statically sizing the memory 44 for the worst case memory requirement. For statically sizing a memory able to hold 200 ms of G.711 encoder data;

```
Required memory 44 amount =
    MAXIMUM (G711d_inst, G726d_inst, G728_inst) +
    XCFG_GLOBAL_MAX_JITTER_MSEC*8
```

Typical values for the above example are:

```
G711d_inst = 16 bytes
G726d_inst = 68 bytes
G728d_inst = 2020 bytes
XCFG_GLOBAL_MAX_JITTER_MSEC = 200
```

Thus the memory saving by not using a static memory equals 1200 bytes (i.e., 1600 bytes required for G.711 minus 400 bytes required for G.728).

Although memory portions 46 and 48 have been shown as distinct and separate in FIG. 1, those skilled in the art will recognize that the memory portions could be arranged in other ways, such as interleaved.

While the invention has been described with reference to one or more preferred embodiments, those skilled in the art will understand that changes may be made and equivalents may be substituted without departing from the scope of the invention. For example, although only a single channel is shown in FIG. 1, the invention can be used with multiple channels. Typically, a chip used to implement the invention would service hundreds of channels. As a result, the amount of memory saved by such a chip is substantial. The depacketizing engine and decoder shown in FIG. 1 may be repeated for each channel, or depending on the size of memory 44 and speed of CPU 42, a single memory and CPU may be used for more than one channel.

In addition to memory 44, computer readable media within the scope of the invention include magnetic media, such as floppy disks and hard drive, as well as optical media, including CD-ROMs and DVDs.

In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. A decoder for decoding compressed data received by the decoder comprising:
    a memory arranged to store the compressed data and to store at least one of operating data and operating code for a plurality of decompression algorithms requiring different amounts of memory for the operating data and operating code and requiring different amounts of memory to store compressed data corresponding to a predetermined duration of uncompressed data; and
    a processor arranged to select one of the decompression algorithms based on an analysis of the compressed data, to allocate an amount of the memory for storing compressed data and at least one of operating data and operating code depending on the decompression algorithm selected and to decode the compressed data stored in the allocated amount of memory.

2. The decoder of claim 1 wherein the allocated portion of memory comprises a first portion arranged to store at least one of the operating data and operating code for the selected decompression algorithm and a second portion arranged to store an amount of compressed data suitable for the selected decompression algorithm.

3. The decoder of claim 1 wherein the compressed data comprises compressed voice data.

4. The decoder of claim 3 wherein the decompression algorithms comprise voice data decompression algorithms.

5. The decoder of claim 4 wherein the decoder is arranged to decode compressed data resulting from a phone call and wherein the processor is arranged to select the decompression algorithm arid to allocate the amount of memory during the phone call.

6. The decoder of claim 1 wherein the compressed data comprises identification data identifying the compression algorithm used to encode the compressed data and wherein the processor is arranged to select the decompression algorithm in response to the identification data.

7. The decoder of claim 1 wherein the processor is further arranged to remove jitter from the compressed data stored in the allocated amount of memory.

8. The decoder of claim 1 wherein the memory is arranged to store operating data and operating code.

9. A method of allocating memory for decoding compressed data received by a decoder comprising:
    storing at least one of operating data and operating code for a plurality of decompression algorithms requiring different amounts of memory for the operating data and operating code and requiring different amounts of memory to store compressed data corresponding to a predetermined duration of uncompressed data;
    selecting one of the decompression algorithms based on an analysis of the compressed data;
    allocating an amount of the memory for storing compressed data and at least one of operating data and operating code depending on the decompression algorithm selected;
    storing at last a portion of the compressed data in the allocated amount of memory; and
    decoding the stored compressed data using the selected decompression algorithm.

10. The method of claim 9 wherein said allocating comprises:
    allocating a first amount of memory for storing the at least one of operating data and operating code for the selected decompression algorithm; and
    allocating a second amount of memory for storing an amount of compressed data suitable for the selected decompression algorithm.

11. The method of claim 9 wherein the compressed data comprises compressed voice data.

12. The method of claim 11 wherein the decompression algorithms comprise voice data decompression algorithms.

13. The method of claim 12 wherein the decoding occurs during a phone call and wherein said selecting and allocating occurs during the phone call.

14. The method of claim 9 wherein the compressed data comprises identification data identifying the compression algorithm used to encode the compressed data and wherein said selecting comprises selecting the decompression algorithm in response to the identification data.

15. The method of claim 9 further comprising removing jitter from the compressed data stored in the allocated amount of memory.

16. The method of claim 9 wherein the storing at least one of operating data and operating code comprises storing both operating data and operating code.

17. Apparatus for allocating memory for decoding compressed data received by a decoder comprising:
- means for storing the compressed data and for storing at least one of operating data and operating code for a plurality of decompression algorithms requiring different amounts of memory for the operating data and operating code and requiring different amounts of memory to store compressed data corresponding to a predetermined duration of uncompressed data; and
- means for selecting one of the decompression algorithms based on an analysis of the compressed data and for allocating an amount of the memory for storing compressed data and at least one of operating data and operating code depending on the decompression algorithm selected.

18. The apparatus of claim 17 wherein said means for selecting and allocating comprises means for allocating a first amount of memory for storing at least one of the operating data and operating code for the selected decompression algorithm and for allocating a second amount of memory for storing an amount of compressed data suitable for the selected decompression algorithm.

19. The apparatus of claim 17 wherein the compressed data comprises compressed voice data.

20. The apparatus of claim 19 wherein the decompression algorithms comprise voice data decompression algorithms.

21. The apparatus of claim 17 wherein the decoding occurs during a phone call and wherein the means for selecting and allocating operates during the phone call.

22. The apparatus of claim 17 wherein the compressed data comprises identification data identifying the compression algorithm used to encode the compressed data and wherein said means for selecting and allocating comprises means for selecting the decompression algorithm in response to the identification data.

23. The apparatus of claim 17 further comprising means for removing jitter from the compressed data stored in the allocated amount of memory.

24. The apparatus of claim 17 wherein the means for storing comprises means for storing the operating data and the operating code.

25. A computer readable media encoded with executable instructions representing a computer program that can cause a computer to perform the tasks of:
- storing at least one of operating data and operating code for a plurality of decompression algorithms requiring different amounts of memory for the operating data and operating code and requiring different amounts of memory to store compressed data corresponding to a predetermined duration of uncompressed data, the compressed data being received by a decoder;
- selecting one of the decompression algorithms based on an analysis of the compressed data;
- allocating an amount of the memory for storing compressed data and at least one of operating data and operating code depending on the decompression algorithm selected;
- storing at last a portion of the compressed data in the allocated amount of memory; and
- decoding the stored compressed data using the selected decompression algorithm.

26. The media of claim 25 wherein said allocating comprises:
- allocating a first amount of memory for storing at least one of the operating data and operating code for the selected decompression algorithm; and
- allocating a second amount of memory for storing an amount of compressed data suitable for the selected decompression algorithm.

27. The media of claim 25 wherein the compressed data comprises compressed voice data.

28. The media of claim 27 wherein the decompression algorithms comprise voice data decompression algorithms.

29. The media of claim 28 wherein the decoding occurs during a phone call and wherein said selecting and allocating occurs during the phone call.

30. The media of claim 25 wherein the compressed data comprises identification data identifying the compression algorithm used to encode the compressed data and wherein said selecting comprises selecting the decompression algorithm in response to the identification data.

31. The media of claim 25 wherein the instructions can further cause a computer to perform the task of removing jitter from the compressed data stored in the allocated amount of memory.

32. The media of claim 25 wherein the task of storing at least one of operating data arid operating code comprises the task of storing both operating data and operating code.

* * * * *